United States Patent
Yoshikawa et al.

(10) Patent No.: US 7,056,603 B2
(45) Date of Patent: Jun. 6, 2006

(54) TOUCH PANEL

(75) Inventors: Masato Yoshikawa, Tokyo (JP);
Yoshinori Iwabuchi, Tokyo (JP);
Yukihiro Kusano, Tokyo (JP);
Mitsuhiro Nishida, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/788,308

(22) Filed: Mar. 1, 2004

(65) Prior Publication Data

US 2004/0165005 A1    Aug. 26, 2004

Related U.S. Application Data

(62) Division of application No. 09/989,436, filed on Nov. 21, 2001, now Pat. No. 6,744,425.

(30) Foreign Application Priority Data

Dec. 26, 2000  (JP) ............................. 2000-395426
Dec. 26, 2000  (JP) ............................. 2000-395427
Dec. 26, 2000  (JP) ............................. 2000-395428

(51) Int. Cl.
*B32B 9/04*    (2006.01)
(52) U.S. Cl. .................. 428/698; 428/323; 428/446; 428/448; 428/697; 428/702; 345/173

(58) Field of Classification Search ................ 428/697, 428/446, 448, 701, 702, 698, 458, 323; 345/173, 345/176; 204/192.1; 427/255.18
See application file for complete search history.

(56) References Cited

U.S. PATENT DOCUMENTS 5,493,102 A * 2/1996 Takase et al. ................ 219/547
6,495,253 B1 * 12/2002 Koyama et al. ............ 428/343
6,617,056 B1 * 9/2003 Hara et al. .................. 428/697

FOREIGN PATENT DOCUMENTS

JP            10171599 A   * 6/1998
JP         2000351170 A   * 12/2000
WO    WO 200016251 A1  * 3/2000

* cited by examiner

*Primary Examiner*—Stephen Stein
(74) *Attorney, Agent, or Firm*—Manabu Kanesaka

(57) ABSTRACT

A touch panel includes a transparent electro-conductive film. The transparent electro-conductive film comprises a primary layer formed on a polymer film, and a transparent electro-conductive thin film or a multi-lamination film composed of at least one metal-compound layer and at least one electro-conductive-metal layer is formed on the primary layer. The primary layer is made of silicon compound. The primary layer is formed by sputtering, using a target having a density of 2.9 g/cm$^3$ or more.

11 Claims, 3 Drawing Sheets

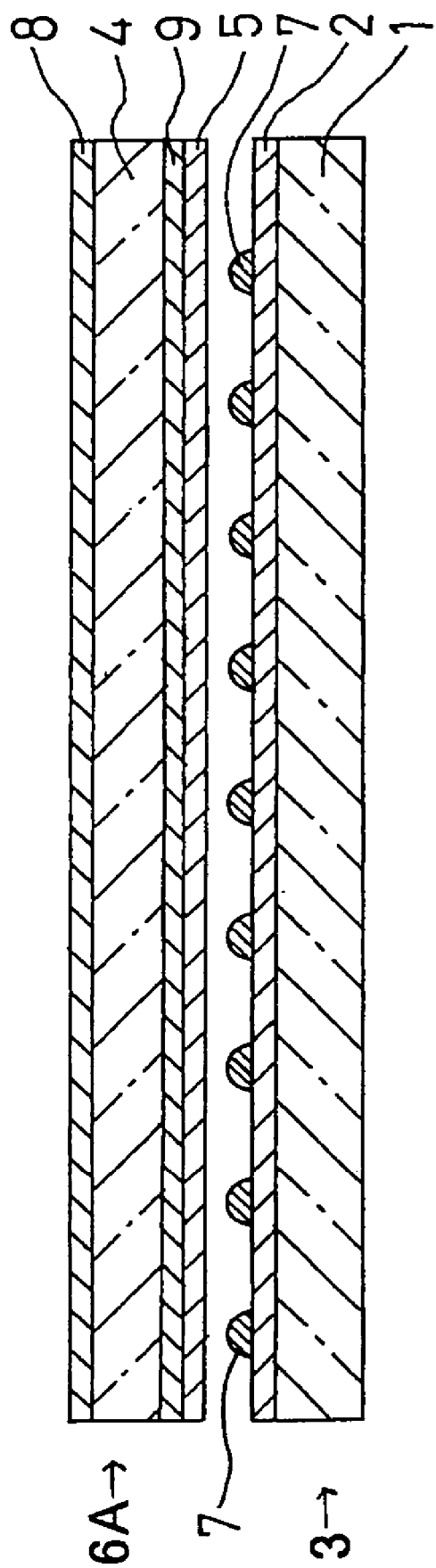

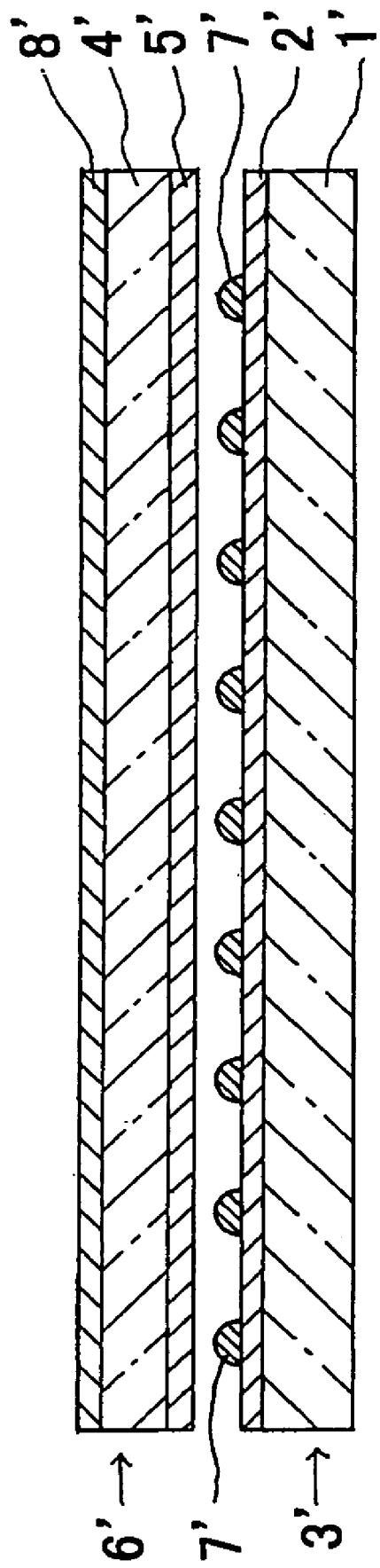

TOUCH PANEL

CROSS-REFERENCE TO RELATED APPLICATION

This is a divisional application of Ser. No. 09/989,436, now U.S. Pat. No. 6,744,425, filed on Nov. 21, 2001.

FIELD OF THE INVENTION

The present invention relates to a touch panel using a transparent electro-conductive film having a polymer film and a transparent electro-conductive thin film formed thereon.

BACKGROUND OF THE INVENTION

A resistive film-type touch panel is widely used as an input unit for a household appliance or a portable terminal. When a user pushes a part of the touch panel or draws with a specialized pen on a part of the touch panel, the part comes into contact with an opposing electrode, so that the portion and the electrode are electrically connected and a signal is inputted.

A typical resistive film-type touch panel has a lower electrode 3' formed of a transparent electro-conductive thin film 2' laminated on a glass plate 1', an upper electrode 6' formed of a transparent electro-conductive thin film 5' formed on a polymer film 4', and spacers 7' interposed between the transparent electro-conductive thin films 2' and 5' as shown in FIG. 2. Pressing the display surface of the upper electrode 6' with a finger or a pen makes the upper electrode 6' and the lower electrode 3' into contact with each other, so that these electrodes are electrically connected and a signal is outputted. The front of the upper electrode 6' is overlaid with a hard-coating layer 8' for protecting the polymer film 4'.

It is necessary for the touch panel 6' to have good resistance to scuffing, because the touch surface on the upper electrode 6' is often pressed and rubbed with a finger or pen. It is necessary for the upper electrode 6' to spring back after the upper electrode 6' is pressed and rubbed with a finger or pen so as to come into contact with the lower electrode 3'.

A front panel of a PDP (plasma display panel) is required to have anti-reflecting properties, heat ray reflecting properties (near infrared blocking capability), and electromagnetic wave shielding capability. A front panel overlaid with a multi-lamination film having layers of metal compound such as ITO (indium tin oxide) and layers of electrically conductive metal such as Ag which are formed alternately on a PET film has the heat ray reflecting properties and the electromagnetic wave shielding capability.

The laminated layers are formed by sputtering process, vacuum spraying process, ion plating process, CVD process or the like.

SUMMARY OF THE INVENTION

A transparent electro-conductive film of the first aspect of the invention has a polymer film, a primary layer formed on the polymer film, and a transparent electro-conductive thin film laminated on the primary layer.

The primary layer bonds the transparent electro-conductive thin film to the polymer film and provides good resistance to scuffing for the transparent electro-conductive film. The primary layer prevents gas generation from the polymer film during the formation of the transparent electro-conductive film, whereby the transparent electro-conductive film adheres firmly to the polymer film.

A transparent electro-conductive film of the second aspect of the invention has a polymer film, a primary layer formed on the polymer film and a multi-lamination film composed of layers of metal compound and layers of electro-conductive metal, which are formed on the primary layer.

The primary layer improves the adhesion value of the multi-lamination film and prevents peeling of the multi-lamination film. The primary layer on the polymer film prevents gas generation from the polymer film while the multi-lamination film is being formed on the primary layer, whereby the multi-lamination film properly adheres to the polymer film.

The primary layer improves the strength of the transparent electro-conductive film.

According to the third aspect of the invention, there will be provided a method for manufacturing a transparent electro-conductive film of the present invention having a primary layer made of silicon compound. The method has a process for forming the primary layer by coating the polymer film with the silicon compound or a liquid substance including the silicon compound.

According to the fourth aspect of the invention, there will be provided a method for manufacturing a transparent electro-conductive film of the present invention having a primary layer made of silicon compound. The method has a process for forming the primary layer by adhering the silicon compound to the surface of the polymer film by a physical depositing method such as vacuum spraying method, sputtering method and ion plating method, or by a chemical depositing method such as CVD method.

According to the fifth aspect of the invention, there will be provided a method for manufacturing a transparent electro-conductive film of the present invention having a primary layer made of silicon compound. The method has a process for forming the primary layer by coating the polymer film with ultraviolet curing resin including particles composed of one or more types of silicon compound selected from the group consisting of $SiC_x$, $SiO_x$, $SiN_x$, $SiC_xO_y$, $SiC_xN_y$, $SiO_xN_y$ and $SiC_xO_yN_z$.

A touch panel of the present invention is equipped with the aforementioned transparent electro-conductive film.

According to the sixth aspect, there will be provided a method for manufacturing a transparent electro-conductive film of the present invention having a primary layer made of a silicon compound. The method has a process for forming the primary layer by coating the polymer film with the silicon compound or a liquid substance including the silicon compound.

According to the seventh aspect, there will be provided a method for manufacturing a transparent electro-conductive film of the present invention comprising a primary layer made of a silicon compound, which includes a process for forming the primary layer by adhering said silicon compound to the surface of the polymer film by a physical depositing method such as vacuum spraying method, sputtering method and ion plating method, or by a chemical depositing method such as CVD method.

BRIEF DESCRIPTION OF THE DRAWINGS

FIG. 1 shows a cross section of a touch panel of an embodiment equipped with a transparent electro-conductive film of the present invention;

FIG. 2 shows a cross section of a conventional touch panel; and

DETAILED DESCRIPTION OF PREFERRED EMBODIMENTS

Figure 3A:
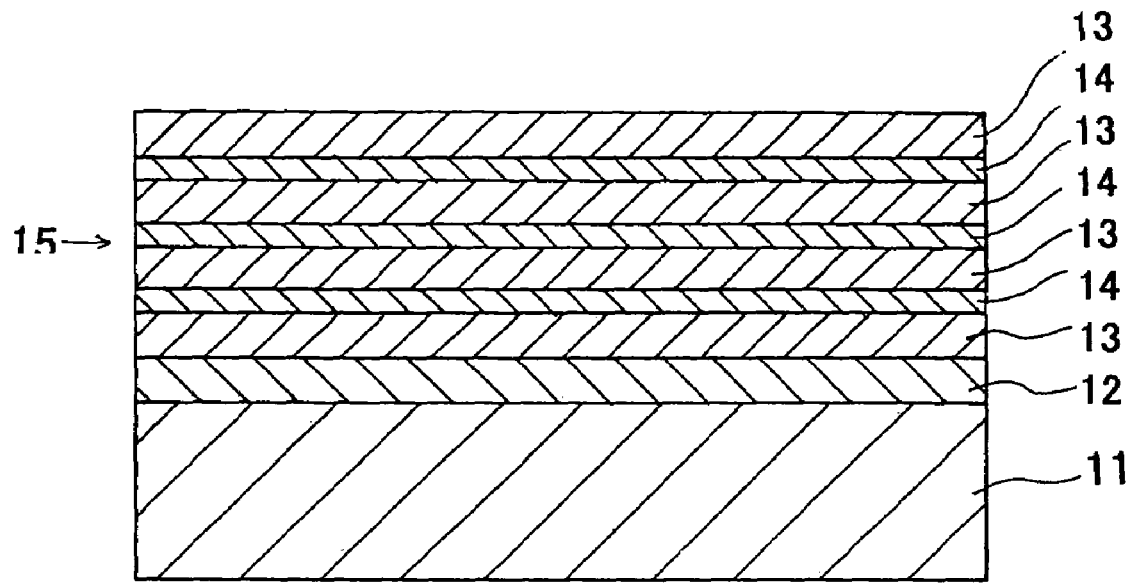
FIGS. 3a and 3b are cross sectional views showing other embodiments of transparent electro-conductive films according to the present invention.

Hereinafter, embodiments of the present invention will be described in detail with reference to the drawings.

First, a transparent electro-conductive film of the first aspect according to the present invention, a method for manufacturing the transparent electro-conductive film, and a touch panel are to be described with reference to FIG. 1.

FIG. 1 shows a cross section of a touch panel of an embodiment equipped with a transparent electro-conductive film of the present invention as an upper electrode.

The touch panel has a lower electrode 3 formed of a transparent electro-conductive thin film 2 laminated on a glass plate 1, an upper electrode 6A formed of a transparent electro-conductive thin film 5 formed on a polymer film 4, and spacers 7 interposed between the transparent electro-conductive thin films 2 and 5. Pressing the display surface of the upper electrode 6A with a finger or a pen makes the upper electrode 6A and the lower electrode 3 into contact with each other, so that these electrodes are electrically connected and a signal is outputted. The front of the upper electrode 6A is overlaid with a hard-coating layer 8 for protecting the polymer film 4.

The transparent electro-conductive film has a polymer film 4, a primary layer 9 formed on the polymer film 4, and a transparent electro-conductive film 5 formed on the under layer 9.

The polymer film 4 may be, but not limited, composed of polyester, polyethylene terephtalate (PET), polybutylene terephtalate, polymethyl methacrylate (PMMA), acrylic resin, polycarbonate (PC), polystyrene, triacetate (TAC), polyvinyl alcohol, polyvinyl chloride, polyvinylidene chloride, polyethylene, ethylene-vinyl acetate copolymers, polyvinyl butyral, metal ion-crosslinked ethylene-methacrylate copolymers, polyurethane, cellophane, or the like, preferably of PET, PC, PMMA, or TAC because of its high strength, and more preferably of PET or TAC.

When employed as an upper electrode of a touch panel, the polymer film 4 may have a thickness of around 13 μm to 0.5 mm. The polymer film having a thickness more than 13 μm has good durability, and the polymer film having a thickness less than 0.5 mm has good flexibility.

The primary layer 9 is made preferably of silicon compound. The silicon compound has an intermediate nature between a polymer film made of an organic material and a metal-compound layer made of an inorganic material or an electro-conductive-metal layer made of a metal material, so that it properly bonds the polymer film and the layers together. Since the silicon compound generally has good transparency, it is suitable for the transparent electro-conductive film which is required to have high transparency. The silicon compound consists preferably of $SiC_x$, $SiO_x$, $SiN_x$, $SiC_xO_y$, $SiC_xN_y$, $SiO_xN_y$, or $SiC_xO_yN_z$, more preferably of $SiC_x$ ($x=1\times10^{-6}$ to 10), $SiO_x$ ($x=1\times10^{-6}$ to 5), $SiN_x$ ($x=1\times10^{-6}$ to 5), $SiC_xO_y$ ($x=1\times10^{-6}$ to 10, $y=1\times10^{-6}$ to 5), $SiC_xN_y$ ($x=1\times10^{-6}$ to 10, $y=1\times10^{-6}$ t 5), $SiO_xN_y$ ($x=1\times10^{-6}$ to 5, $y=1\times10^{-6}$ to 5), or $SiC_xO_yN_z$ ($x=1\times10^{-6}$ to 10, $y=1\times10^{-6}$ to 5, $z=1\times10^{-6}$ to 5). The primary layer 9 may include two or more types of the silicon compound, or may be composed of layers made of those of the silicon compound. The primary layer 9 has a thickness preferably of 0.5 nm to 100 μm, more preferably of 1 nm to 50 μm, most preferably of 1 nm to 10 μm.

The transparent electro-conductive thin film 5 on the primary layer 9 is an oxide-based transparent electro-conductive thin film made of ITO (indium tin oxide), ATO (antimony tin oxide), ZnO, ZnO doped with Al, or $SnO_2$. The transparent electro-conductive thin film 5 has a thickness preferably of 1 to 500 nm, more preferably of 5 to 100 nm.

The primary layer 9 is formed preferably by a physical vapor deposition process such as vacuum spraying process, sputtering process, ion plating process, etc., or by a chemical vapor deposition process such as CVD process, etc., most preferably by sputtering. The primary layer can be formed by coating the polymer film with the silicon compound as it is or with a liquid substance including the silicon compound such as a solution of the silicon compound and a solvent such as alcohol, ketone, toluene, hexane, etc., followed by drying it. The primary layer deposited physically or chemically is fine and good in adhesion value, and it is almost free of contamination during the formation thereof. The deposited primary layer can be formed at high speed. The transparent electro-conductive film may be formed in the same system as the primary layer following the formation of the primary layer.

When the primary layer made of $SiC_x$, $SiO_x$, $SiN_x$, $SiC_xO_y$, $SiC_xN_y$, $SiO_xN_y$, or $SiC_xO_yN_z$ is formed by sputtering process, Si, SiC, SiO, $SiO_2$ or $Si_3N_4$ may be used as target material. The primary layer composed of desired components can be formed by adjusting the type and the flow rate of reactive gas during the sputtering process.

The target may be SiC target having a density of 2.9 g/cm³ or more, which can be made by sintering SiC powder with a nonmetal-based sintering assistant such as coal tar pitch, phenol resin, furan resin, epoxy resin, glucose, sucrose, cellulose, starch, etc. Applying high voltage during the sputtering process in order to speed up the formation of the layer causes arc discharge to harm the polymer film easily. On the other hand, the SiC target having high density and uniformity causes glow discharge even when high voltage is applied during the formation of the layer.

The SiC target can be produced by sintering a homogeneous mixture of SiC powder and the nonmetal-based sintering assistant of around 3 to 30% by weight at 1700 to 2200° C.

The sputtering condition during the formation of the primary layer may include a degree of vacuum to be around 0.05 to 1 Pa and a density of introduced electric power to be around 2 to 500 kW/m². Adjusting the flow rate of reactive gas and the length of time for the layer to be formed during the formation of the layer realizes the primary layer composed of desired composition and having a desired thickness.

The primary layer can be formed by coating the polymer film with the silicon compound as it is or with a liquid substrate such as a solution of the silicon compound and a solvent such as alcohol, ketone, toluene, hexane, etc., and then drying it. The primary layer may be formed by coating the polymer film with ultraviolet-curing resin including particles of the silicon compound dispersed therein.

The particles of the silicon compound preferably include at least one silicon compound selected from the group consisting of $SiC_x$, $SiO_x$, $SiN_x$, $SiC_xO_y$, $SiC_xN_y$, $SiO_xN_y$, and $SiC_xO_yN_z$.

Each of the particles of the silicon compound may have acrylic groups, epoxy groups or carboxyl groups, which are reactive with respect to the ultraviolet-curing resin, on its surface. The silicon compound particles are preferably made from acryl-modified silica which is obtained by condensing colloidal silica and acryl group-modified silane compound.

The silicon compound particles have an average diameter preferably of 1 nm to 5 μm.

The silicon compound particles are incorporated into the ultraviolet-curing resin in an amount preferably of 1 to 90% by weight, more preferably of 10 to 50% by weight.

The ultraviolet-curing resin preferably is acryl-based resin, epoxy-based resin or urethane-based resin.

The primary layer is formed by coating the polymer film with a coating liquid of the ultraviolet-curing resin including the silicon compound particles in a desired rate and irradiating it with ultraviolet rays to cure it, such that the cured layer has a thickness preferably of 1 nm to 10 μm, more preferably of 10 nm to 5 μm.

The transparent electro-conductive film of the present invention may have a hard-coating layer 8 formed on a surface of the polymer film 4 opposite to another surface where the transparent electro-conductive thin film 5 is formed. The hard-coating layer 8 may be formed of an acryl-based layer, epoxy-based layer, urethane-based layer or silicon-based layer, and it has a thickness preferably of 1 to 50 μm, more preferably of 1 to 10 μm.

The polymer film 4 may be applied with plasma treatment at its surface prior to forming the primary layer 9 thereon. The plasma treatment provides functional groups on the surface of the polymer film 4 so as to improve adhesive values between the polymer film 4 and the primary layer 9, and the anchor effect of etching caused by the plasma treatment also improves the adhesive force of the primary layer 9 to the polymer film 4.

A touch panel of an embodiment according to the present invention is equipped with the transparent electro-conductive film as an upper electrode 6A, as shown in FIG. 1. The polymer film 4 of this transparent electro-conductive film adheres to the transparent electro-conductive thin film 5 and has good resistance to scuffing, thereby providing durability and reliability for the touch panel.

The transparent electro-conductive film of the present invention can be employed as an optical transparent electro-conductive film for a variety of devices such as a transparent switching device, other than the upper electrode of the touch panel.

Following is description of a transparent electro-conductive film of the second aspect and a manufacturing method thereof.

Figure 3B:
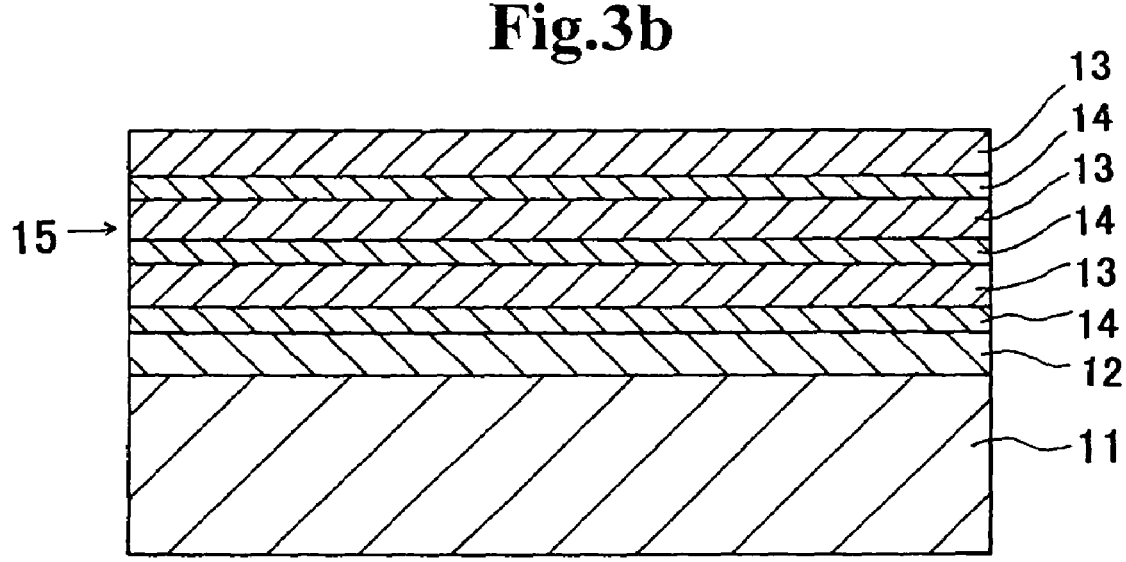

FIGS. 3a and 3b are cross sectional views showing other embodiments of transparent electro-conductive films according to the present invention.

The transparent electro-conductive film comprises a polymer film 11, a primary layer 12 formed on the polymer film 11, and a multi-lamination film 15 composed of metal-compound layers 13 and electro-conductive-metal layers 14, formed on the primary layer 12.

The polymer film 11 is composed of polyester, polyethylene terephtalate (PET), polybutylene terephtalate, polymethyl methacrylate (PMMA), acrylic resin, polycarbonate (PC), polystyrene, triacetate (TAC), polyvinyl alcohol, polyvinyl chloride, polyvinylidene chloride, polyethylene, ethylene-vinyl acetate copolymers, polyvinyl butyral, metal ion-crosslinked ethylene-methacrylate copolymers, polyurethane, cellophane, or the like, preferably of PET, PC, PMMA, or TAC because of high strength of those, more preferably of PET or TAC.

When employed as a heat-ray blocking film with electromagnetic-wave shielding properties to be mounted on the front of a PDP, the polymer film 11 has a thickness preferably of 13 μm to 0.5 mm.

The primary layer 12 formed on the polymer film 11 is made preferably of silicon compound, more preferably of $SiC_x$, $SiO_x$, $SiN_x$, $SiC_xO_y$, $SiC_xN_y$, $SiO_xN_y$, and $SiC_xO_yN_z$. The primary layer 12 may include two or more types of the silicon compound, or may be composed of layers of two or more types of the silicon compound.

The primary layer 12 has a thickness preferably of 0.5 nm to 50 μm, more preferably of 1 nm to 50 μm, most preferably of 1 nm to 10 μm.

The metal-compound layer 13 constituting the multi-lamination film 15 can be formed of a transparent electro-conductive material such as ITO, $In_2O_3$, $SiO_2$, ZnO and the like or a transparent material such as $TiO_2$, $SiO_2$, SiN and the like; besides, it can be formed of a composite metal compound composed of at least two selected from the above material group.

The metal-compound layer 13 may be made of ZnO doped with Al, Si, B, Ti, Sn, Mg, Cr, F, Ga or the like each ion of which has a smaller diameter than that of Zn2+, at an atomic percentage of 10% or less.

The electro-conductive-metal layer 14 may be made of one or more selected from the group consisting of Ag, Au, Pt, Cu, Al, Cr, Ti, Zn, Sn, Ni, Co, Hf, Nb, Ta, W, Zr, Pb, Pd and In.

The metal-compound layer 13 has a thickness preferably of 20 to 200 nm and the electro-conductive-metal layer 14 has a thickness preferably of 5 to 20 nm.

The multi-lamination film 15 is composed of the metal-compound layers 13 and the electro-conductive-metal layers 14 which preferably are alternately laminated, wherein the layer which is directly laminated on the primary layer 12 may be either the metal-compound layer 13, as shown in FIG. 3a, or the electro-conductive-metal layer 14, as shown in FIG. 3b.

The multi-lamination film 15 preferably comprises one to seven metal-compound layers 13 and one to six electro-conductive-metal layers 14, wherein the topmost layer preferably is the metal-compound layer 13.

The primary layer 12 of this transparent electro-conductive film may be formed in the same manner as that of the primary layer 9 of the transparent electro-conductive film according to the first aspect. That is, the primary layer 12 is formed preferably by a physical vapor-deposition process such as vacuum spraying process, sputtering process, ion plating process, etc., or by a chemical vapor-deposition process such as CVD process, etc., most preferably by sputtering process. The primary layer can be formed by coating the polymer film with the silicon compound as it is or with a liquid substance including the silicon compound such as a solution of the silicon compound and a solvent such as alcohol, ketone, toluene, hexane, etc., and then drying it. The primary layer 12 deposited physically or chemically is fine and is good in adhesion value, and it is almost free of contamination during the formation thereof. The deposited primary layer can be formed at high speed. The multi-lamination film 15 may be formed in the same system following the formation of the primary layer.

The target material used in case that the primary layer 12 is formed by sputtering and the sputtering conditions are the same as those used in the formation of the primary layer 9 of the transparent electro-conductive film according to the first aspect.

Also in the transparent electro-conductive film of the second aspect, the surface of the polymer film 11 may be applied with plasma treatment prior to forming the primary layer 12.

The transparent electro-conductive film of the second aspect is very useful as a heat-ray blocking film with electromagnetic-wave shielding properties to be mounted on the front of a PDP.

EXAMPLES 1 AND 2

A PET film having a thickness of 188 μm was employed as a substrate. A hard-coating layer with a thickness of 5 μm was, first, formed on one surface of the PET film by wet painting using an acryl-based photo-curing hard coating material (Z7501 produced by JSR, in which the solid content was 35% by weight and the solvent was MEK.). The film was, then, cut up into a size of 100 mm×100 mm and was applied with plasma treatment at one surface opposite to another surface on which the hard-coating layer was formed. The plasma treatment was made for 10 minutes at a power of 100 W by using a high-frequency electric source (13.56 MHz) in state where the degree of vacuum was held at 13.3 Pa with argon gas flowing at a rate of 100 ml/min.

After that, a primary layer of a silicon compound having a thickness of 10 nm was formed by means of a magnetron sputtering device, using a silicon target having a size of 100 mm×400 mm×5 mm and purity of 99.99% as a target in the filming conditions below-described. And then, an ITO thin film having a thickness of 20 nm was formed as a transparent electro-conductive film on the primary layer by means of the same magnetron sputtering device as above, using an ITO target with purity of 99.99% measuring 100 mm×400 mm×5 mm, including tin oxide with 10% by weight, as a target. In this manner, a transparent electro-conductive film for a touch panel was produced.

[The Filming Condition of the Silicon Compound Thin Film]
Flow rate of argon gas: as shown in Table 1
Flow rate of reactive gas: as shown in Table 1
Degree of vacuum: 0.5 Pa
Introduced DC power: 2 kW
Length of filming time: as shown in Table 1
Rotary speed of substrate: 10 rpm

[The Filming Condition of the ITO Thin Film]
Flow rate of argon gas: 50 cc/min
Flow rate of oxygen: 3 cc/min
Degree of vacuum: 0.5 Pa
Introduced DC power: 2 kW
Length of filming time: 60 sec
Rotary speed of substrate: 10 rpm The durability test was made by scratching the resulted films with a pen in the following manner, and the results are shown in Table 1.

[The Manner of the Durability Test]

The resulted film was scratched with a pen applied with a load of 250 g one hundred thousand times. After that, the film was measured in electrical resistance. The evaluation of the film was made in such a manner that if the change in the electrical resistance before and after the film being scratched was less than 50%, the film was regarded to be "Good", however, if the change was 50% or more, the film was regarded to be "Inferior".

COMPARATIVE EXAMPLE 1

A transparent electro-conductive film was produced in the same manner as Example 1 except that the primary layer was not formed and the durability test of the film was made in the same manner as that of Example 1. The result of the test is shown in Table 1.

TABLE 1

| | flow rate of argon gas (cc/min) | flow rate of reactive gas (cc/min) | | length of filming time (sec) | silicon compound in the primary layer | durability |
|---|---|---|---|---|---|---|
| | | oxygen gas | nitrogen gas | | | |
| Example 1 | 25 | 25 | 0 | 120 | $SiO_x$ (x = 1.9) | Good |
| Example 2 | 0 | 0 | 50 | 60 | $SiN_x$ (x = 1.2) | Good |
| Comparative Example 1 | | | no primary layer | | | Inferior |

EXAMPLES 3–7

Transparent electro-conductive films for a touch panel were produced in the same manner as Example 1 except that the primary layer, having a thickness of 10 nm, of each film was formed by means of a magnetron sputtering device using a SiC target in the filming conditions described below, and the durability test was made in each film in the same manner as that of Example 1. The results of the test are shown in Table 2.

The SiC target used was produced by sintering SiC powder at 2100° C. with phenolic resin as a sintering assistant which had been homogeneously included therein at a weight percentage of 20%, and the density of the target thus produced was 2.92 g/cm³.

[The Filming Condition of the Silicon Compound Thin Film]
Flow rate of argon gas: as shown in Table 2
Flow rate of reactive gas: as shown in Table 2
Degree of vacuum: 0.5 Pa
Introduced DC power: 2 kW
Length of filming time: as shown in Table 2
Rotary speed of substrate: 10 rpm

TABLE 2

|  | flow rate of argon gas (cc/min) | flow rate of reactive gas (cc/min) | | length of filming time (sec) | silicon compound in the primary layer | durability |
|---|---|---|---|---|---|---|
|  |  | oxygen gas | nitrogen gas |  |  |  |
| Example 3 | 50 | 0 | 0 | 80 | SiC | Good |
| Example 4 | 40 | 10 | 0 | 40 | $SiC_xO_y$ (x = 0.2, y = 1.7) | Good |
| Example 5 | 25 | 25 | 0 | 80 | $SiC_xO_y$ (x = 0.1, y = 1.9) | Good |
| Example 6 | 0 | 0 | 50 | 40 | $SiC_xN_y$ (x = 0.1, y = 1.3) | Good |
| Example 7 | 30 | 10 | 10 | 40 | $SiC_xN_yO_z$ (x = 0.1, y = 0.9, z = 1.1) | Good |

EXAMPLE 8

A PET film having a thickness of 188 μm was employed as a substrate. UV-curing acrylic resin liquid including 30 weight percent acryl-modified silica particles having an average diameter of 20 nm, which had been obtained by condensing colloidal silica and acryl-group modified silane compound, was applied on the film with a bar-coater such that the thickness of the resin after curing was to be about 0.1 μm. The resin was then irradiated with ultraviolet rays to cure. After that, ITO was set as a target of a magnetron DC sputtering device, and the PET film overlaid with a primary layer made of the above resin was set in a vacuum chamber. The chamber was evacuated with a turbo-molecular pump to lower its internal pressure to $1 \times 10^{-4}$ Pa, and then 20 cc/min Ar gas and 3 cc/min oxygen gas were introduced into the chamber to hold the internal pressure at 0.5 Pa. After that, the ITO target was applied with voltage, so that an ITO thin film having a thickness of about 30 nm was formed.

The durability test was made in the film thus resulted by scratching the film with a pen in the following manner, and the result of the test is shown in Table 3.

[The Manner of the Durability Test]

The resulted film was scratched with a pen (made of polyacetal resin, having a tip of 0.8R) applied with a load of 250 g one hundred thousand times at its one surface of the PET film opposite to another surface overlaid with ITO film. After that, the film was measured in electrical resistance. The evaluation of the film was made in such a manner that if the change in the electrical resistance before and after the film being scratched was less than 30%, the film was regarded to be "Good", however, if the change was 30% or more, the film was regarded to be "Inferior".

EXAMPLE 9

A transparent electro-conductive film was produced in the same manner as Example 8 except that the primary layer having a thickness of about 3.5 μm was formed using UV-curing acrylic resin including $SiC_xN_y$ particles (x=0.05, y=1.3, average diameter: 50 nm) with 30% by weight, and the durability test was made in the film in the same manner as that of Example 8. The result of the test is shown in Table 3.

COMPARATIVE EXAMPLE 2

A transparent electro-conductive film was produced in the same manner as Example 8 except that the primary layer had not been formed and the durability test in this film was made in the same manner as that of Example 8. The result of the test is shown in Table 3.

TABLE 3

|  | primary layer | | | |
|---|---|---|---|---|
|  | compound | silicon (μm) | thickness | durability |
| Example 8 | $SiO_2$ | | about 0.1 | Good |
| Example 9 | $SiC_xN_y$ | | about 3.5 | Good |
| Comparative Example 2 | | no primary layer | | Inferior |

It is apparent from Table 1 to 3 that there can be provided a transparent electro-conductive film in which the transparent electro-conductive thin film properly adheres to the polymer film and also which has good resistance to scuffing and good durability, according to the present invention.

EXAMPLE 10

Production of a transparent electro-conductive film according to the present invention was done by means of a magnetron DC sputtering device in which SiC, ITO and Ag are set as target materials, using a PET film having a thickness of 188 μm as a substrate.

The SiC target used was produced by sinstering SiC powder at 2100° C. with phenolic resin as a sintering assistant which had been homogeneously included therein at a weight percentage of 20%, and the density of the target thus produced was 2.92 g/cm³.

The vacuum chamber was, first, evacuated and lowered in its internal pressure to $1 \times 10^{-4}$ Pa by means of a turbo-molecular pump, and then 160 cc/min Ar gas and 40 cc/min oxygen gas were introduced into the chamber to hold its internal pressure at 0.5 Pa. In this condition, a $SiC_xO_y$ (x=0.1, y=1.8) thin film having a thickness of about 30 nm was formed on the substrate by applying voltage to the SiC target.

After that, all the gas contained in the chamber was replaced by Ar gas and then 200 cc/min Ar gas and 10 cc/min oxygen gas were introduced into the chamber so as to hold its internal pressure at 0.5 Pa. In such a condition, an ITO thin film having a thickness of about 30 nm was formed by applying voltage to the ITO target.

All the gas contained in the vacuum chamber was replaced by Ar gas such that the internal pressure of the chamber was held at 0.5 Pa. In such a condition, an Ag thin film having a thickness of about 15 nm was formed by applying voltage to the Ag target.

A mixture of gas composed of Ar gas and oxygen gas was introduced into the vacuum chamber such that the internal pressure of the chamber was held at 0.5 Pa. In this condition, an ITO thin film having a thickness of about 30 nm was formed by applying voltage to the ITO target. A transparent electro-conductive film was thus resulted.

The transparent electro-conductive film was tested in durability by exposing it to a hot, humid atmosphere of 60° C. and 90% RH. The evaluation of durability was made by observing the appearance of the film and the result of the evaluation is shown in Table 4.

EXAMPLE 11

Production of a transparent electro-conductive film according to the present invention was done in the same manner as Example 10, as follows.

First, gas contained in the vacuum chamber was evacuated by a turbo-molecular pump to lower the internal pressure of the chamber to $1 \times 10^{-4}$ Pa and then 160 cc/min Ar gas and 40 cc/min oxygen gas were introduced into the chamber to hold its internal pressure of chamber at 0.5 Pa. In this condition, a $SiC_xO_y$ (x=0.1, y=1.8) thin film having a thickness of about 30 nm was formed on the substrate by applying voltage to SiC target.

Secondly, all the gas contained in the chamber was replaced by Ar gas such that the internal pressure of the chamber was held at 0.5 Pa, and then an Ar thin film having a thickness of about 15 nm was formed by applying voltage to Ar target.

After that, 200 cc/min Ar gas and 10 cc/min oxygen gas were introduced into the chamber such that the internal pressure of the chamber was held at 0.5 Pa, and then an ITO thin film having a thickness of about 30 nm was formed by applying voltage to ITO target. A transparent electro-conductive film was thus resulted.

The durability was tested in this film in the same manner as that of Example 10, and the result is shown in Table 4.

COMPARATIVE EXAMPLE 3

A transparent electro-conductive film was produced in the same manner as Example 10 except that the $SiC_xO_y$ thin film as primary layer had not been formed and the durability test in this film was made in the same manner as that of Example 10. The result of the test is shown in Table 4.

COMPARATIVE EXAMPLE 4

A transparent electro-conductive film was produced in the same manner as Example 11 except that the $SiC_xO_y$ thin film as the primary layer had not been formed and the durability test in this film was made in the same manner as that of Example 11. The result of the test is shown in Table 4.

TABLE 4

|  |  | composition of the film | result of testing |
|---|---|---|---|
| Examples | 10 | PET/SiC$_x$O$_y$/ITO/Ag/ITO | almost no change |
|  | 11 | PET/SiC$_x$O$_y$/Ag/ITO | almost no change |
| Comparative Example | 3 | PET/ITO/Ag/ITO | appearance of white dots (rust) and change in color on the periphery of the film |
|  | 4 | PET/Ag/ITO | appearance of a lot of white dots (rust) and significant change in color from the pheriphery to the film |

It is apparent from Table 4 that a transparent electro-conductive film of the present invention is improved in durability by the primary layer.

What is claimed is:

1. A touch panel comprising a transparent electro-conductive film comprising a polymer film, a primary layer formed on the polymer film, and a transparent electro-conductive thin film formed on the primary layer;
   wherein the primary layer comprises an ultraviolet-curing resin containing particles of at least one silicon compound selected from the group consisting of $SiC_x$, $SiN_x$, $SiC_xO_y$, $SiC_xN_y$, $SiO_xN_y$, and $SiC_xO_yN_2$.

2. A touch panel according to claim 1, wherein said primary layer has a thickness of 1 nm to 50 μm.

3. A touch panel according to claim 1, wherein said particles of the silicon compound are provided with acryl groups, epoxy groups or carboxyl groups on surfaces thereof.

4. A touch panel according to claim 3, wherein said particles of the silicon compound are particles of acryl-modified silica produced by condensing colloidal silica and acryl group-modified silane compound.

5. A touch panel according to claim 1, wherein said particles of the silicon compound have an average diameter of 1 nm to 5 μm, and are included in the primary layer at a weight percentage of 1 to 90% to the ultraviolet-curing resin.

6. A touch panel according to claim 1, wherein said primary layer has a thickness of 1 nm to 10 μm.

7. A touch panel according to claim 1, wherein said electro-conductive thin film consists of metal oxide.

8. A touch panel according to claim 7, wherein said metal oxide is at least one selected from the group consisting of indium tin oxide, antimony tin oxide, ZnO, ZnO doped with Al, and $SnO_2$.

9. A touch panel according to claim 7, wherein said electro-conductive thin film has a thickness of 1 to 500 nm.

10. A touch panel according to claim 9, wherein said electro-conductive thin film has a thickness of from 5 to 100 nm.

11. A touch panel according to claim 5, wherein said silicon compound particles are incorporated into the ultraviolet-curing resin in an amount of from 10 to 50% by weight.

* * * * *